United States Patent Office 2,846,297
Patented Aug. 5, 1958

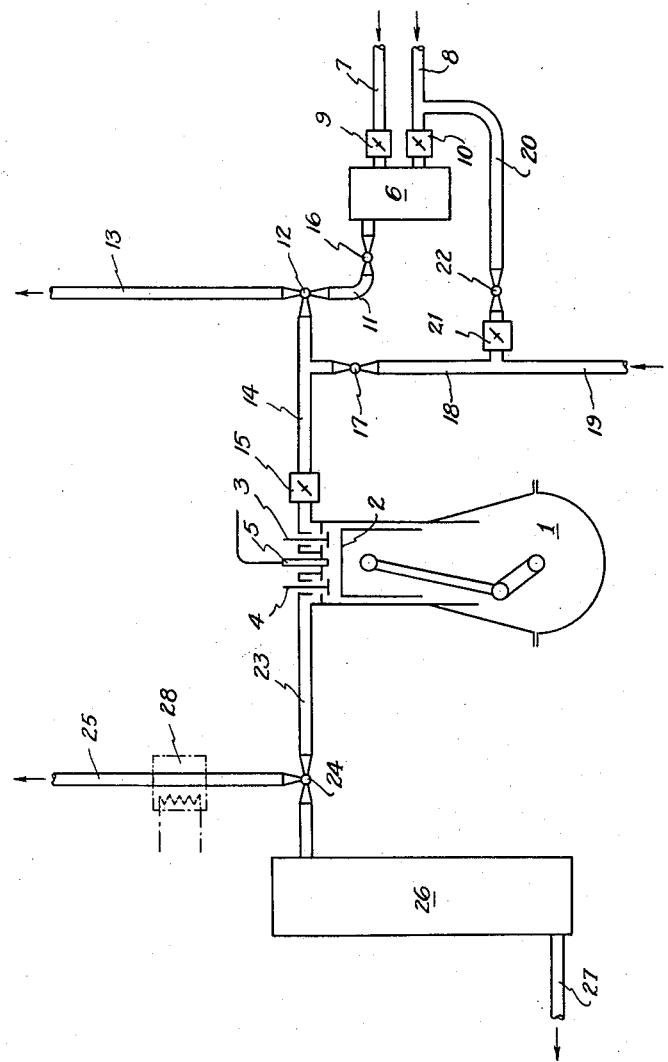

2,846,297

INTERNAL COMBUSTION ENGINE FOR THE PRODUCTION OF SYNTHESIS GAS

Otto Herwig, Nurnberg, Germany, assignor to the firm Maschinenfabrik Augsburg-Nurnberg A. G., Nürnberg, Bavaria, Germany Application October 8, 1954, Serial No. 461,160

Claims priority, application Germany October 10, 1953

1 Claim. (Cl. 48—196)

This invention relates to a method of operating internal combustion engines for incomplete or partial combustion of fuel and has special reference to a process for efficiently producing synthesis gas in an internal combustion engine coupled with the production of power by the engine which is available for work in other phases of the gas generation or the synthesizing process.

It is already known to produce synthesis gas in an internal combustion engine. Thus, for instance, a mixture of methane and oxygen, with a share of oxygen which is smaller than that corresponding to the stoichiometric proportion, may be burnt incompletely or partially. The composition of the exhaust gas in this case is practically a gas mixture consisting of hydrogen and carbon monoxide and being adapted for synthesis. In addition to a corresponding composition of the mixture to be burnt, primarily a favorable temperature and pressure level of the cyclic process is required to ensure that the chemical conversion in the engine takes place in the desired manner and that the synthesis gas which is produced has a favorable composition. This, however, is not the case, for instance, when starting the engine. It has been found by experience that residues are thereby formed in the working cylinders of the engine. Thus, for instance, carbon may be deposited on the spark plugs, causing misfiring and finally complete failure of the ignition. Also premature ignition may be caused by such residues.

It is an object of the present invention to eliminate these defects, and, more particularly, to avoid as much as possible the formation of residues in the working cylinders of the internal combustion engine in the production of synthesis gas.

With this and further objects in view, according to the present invention the engine is started with a mixture of gas and air or with fuel oil of the type used in internal combustion engines in normal, i. e. conventional operation; hereby, even with cold engine a safe and reliable ignition and combustion is ensured. When the engine has reached a condition which is favorable for the production of synthesis gas as regards its temperature and pressure conditions, the engine is changed to operation with synthesis gas. In this manner the formation of substances is avoided which would disturb an unexceptionable operation of the engine or cause troubles in any other respect.

Thus, for instance, in case of the above mentioned generation of synthesis gas in an explosive combustion or Otto cycle engine from a mixture of methane and oxygen the engine may be started and operated at first with a mixture of methane and air of conventional composition. Only when the temperatures and pressures in the engine have reached values which are favorable for the generation of the desired synthesis gas and when the spark plugs are heated up accordingly, the engine will be changed from operation with the methane-air mixture to operation with the methane-oxygen mixture which is required for the generation of the synthesis gas. In this way, detrimental depositions of carbon on the electrodes of the spark plugs, spark failures and premature ignition will be safely avoided.

In engine plants of the type hereinbefore described, more particularly in plants consisting of a plurality of separate engine sets, it may be desirable or necessary for practical reasons to run one or more of the engine sets temporarily as normal internal combustion engine, i. e. for the production of mechanical power only, rather than for the generation of synthesis gas. In order to achieve this aim according to a further feature of the invention means are provided which permit to change the engine even during normal operation, after the starting phase, from synthesis gas operation to pure power-producing operation or vice versa. Moreover, according to a further feature of the invention also the exhaust side of the engine is adapted to be changed over in such a way that in case of pure power-producing operation the exhaust gases issue into the open air directly or after passage through a waste heat economizer or heat exchanger succeeding the internal combustion engine, while in case of the generation of synthesis gas the exhaust gas is supplied to the consumer of the synthesis gas. It will be understood that in the production of synthesis gas the exhaust gas is supplied to the consumer of synthesis gas only after having reached a suitable composition in the course of the starting phase.

The invention will be better understood by reference to the following detailed description of an embodiment of a plant for the generation of synthesis gas from methane which plant is diagrammatically illustrated in the accompanying drawing.

In the drawing, all details have been omitted which are not essential for carrying out the process according to the present invention. It will be seen that the plant comprises a gas engine 1 having a working piston 2, an admission valve 3, an exhaust valve 4 and an ignition device or spark plug 5. Arranged on the admission side of the gas engine is a tank or container 6, to which pure oxygen ($O_2$) can be supplied through a pipe 7 and to which methane ($CH_4$) can be supplied through a pipe 8, under control of valves or other control members 9 or 10, respectively. The mixture tank 6 can be selectively connected, through a pipe 11 and a three-way valve 12, on the one hand to an exhaust or vent pipe 13 and on the other hand to a pipe 14 leading to the admission valve 3 of the gas engine, through an adjustable throttle valve 15. A shut-off valve 16 installed in the pipe line 11 serves to cut off the supply of the methane-oxygen mixture from the mixture tank 6. Connected to the pipe 14, between the adjustable throttle valve 15 and the three-way valve 12 and under control of a shut-off valve 17, is a pipe line 18 which is connected on the one hand with an air intake pipe 19 and on the other hand through a pipe 20 with the pipe 8 leading to the mixture tank 6. By a control valve 21 and a shut-off valve 22 provided in the pipe 20 it is possible to control the supply of methane from the pipe 20 when operating the engine with an air mixture, or to cut off the supply of methane completely when operating the engine for the production of synthesis gas.

Provided on the exhaust valve side of the gas engine is an exhaust pipe 23 which through a three-way valve 24 can be connected either to a pipe 25 leading into the open air or to a collecting tank 26 for synthesis gas from which tank 26 the synthesis gas can be supplied to the consumer through a pipe 27. It is also contemplated to provide in pipe 25 a waste heat economizer 28 for utilizing the heat of the exhaust gases discharged through pipe 25.

The operation of the plant is as follows: The gas engine 1 is at first started with a methane-air mixture of the kind used in normal or conventional operation of a gas engine.

During the starting period the valve 24 is adjusted in such a way that the exhaust pipe 23 is connected to pipe 25. On the admission side of the gas engine the valve 17 for the methane-air mixture is open while the valve 12 prevents the admission of the methane-oxygen mixture from tank 6 to pipe 14. The shut-off valve 22 in pipe 20 on the other hand is in its open position. Therefore, air is sucked on by the gas engine in known manner through the pipe 19, a suitable proportion of methane being added to the air through pipe 8, pipe 20 and control valve 21.

During this starting period a methane-oxygen mixture of a suitable composition for the production of synthesis gas may be prepared in the mixture tank 6. After opening the shut-off valve 16 the methane-oxygen mixture flows from the mixture tank through the three-way valve 12 at first into the vent pipe 13 while the pipe 14 to the gas engine is still disconnected from the mixture tank 6 by the three-way valve 12. The control valve 9 in the oxygen feed pipe 7 and the control valve 10 in the methane feed pipe 8 to the mixture tank 6 serve for adjusting the proper composition of the methane-oxygen mixture for partial combustion.

After the gas engine by its operation with a normal methane-air mixture has reached the proper temperature and the methane oxygen mixture in the mixture tank 6 has been prepared so as to have the proper composition, the plant may be changed to the generation of synthesis gas. To this end, the shut-off valve 17 is closed and the three-way valve 12 is simultaneously readjusted in such a way that the mixture tank 6 is disconnected from the vent pipe 13 and connected to the pipe 14 leading to the admission valve of the gas engine. The supply of methane to pipe 18 will now be cut off by closing the shut-off valve 22. When the changeover operation has been completed, the exhaust pipe 23 of the gas engine is connected with the synthesis gas collecting tank 26 through the three-way valve 24 for supplying the synthesis gas thus generated to the consumer through pipe 27.

By carrying out these operations in the reverse order, the gas engine may be changed from operation for the generation of synthesis gas to operation with ordinary methane-air mixture, according as synthesis gas and mechanical power or mechanical power alone is to be produced.

In both cases, i. e. in case of the generation of synthesis gas and in case of operation with a normal air mixture the speed of the gas engine is controlled by means of the shut-off valve 15, which in its turn is under control of a conventional centrifugal governor (not shown). The valves 17, 12 and 22 may either be operated individually by hand, or they may be interconnected mechanically or in any other manner for ensuring a simultaneous or accurately temporized operation of the various valves. In this way, faults of operation in carrying out the changeover can be avoided to a large extent. If desired, the three-way valve 24 on the exhaust side of the gas engine may also be included in the set of interconnected valves.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claim.

I claim:

A plant for generating synthesis gas and producing mechanical power, comprising an internal combustion engine having separate sources of fuel, oxygen and air, a fuel-oxygen mixture tank connected with said sources of fuel and oxygen, valve means for selectively connecting said fuel and air sources directly to said engine or connecting said mixture tank to said engine for supplying to said engine either a substantially entirely combustible fuel-air mixture or a partially combustible mixture adapted for the generation of synthesis gas, a receiver for synthesis gas, and exhaust valve means connecting said engine and receiver for selectively discharging the exhaust gas from said engine into the open air or in the form of synthesis gas into said receiver.

References Cited in the file of this patent

UNITED STATES PATENTS

| Number | Name | Date |
|---|---|---|
| 1,005,118 | Rabsilber | Oct. 3, 1911 |
| 1,926,170 | Oberfell et al. | Sept. 12, 1933 |
| 2,363,708 | Urquhart | Nov. 28, 1944 |
| 2,543,791 | Malin | Mar. 6, 1951 |
| 2,569,846 | Cornell | Oct. 2, 1951 |
| 2,605,175 | Barber | July 29, 1952 |